SUBSCRIPTION TELEVISION

Original Filed Nov. 30, 1951 3 Sheets-Sheet 1

INVENTOR

Jacob M. Sacks,

BY John J. Pederson

ATTORNEY

INVENTOR
Jacob M. Sacks,
BY John J. Pederson
ATTORNEY

INVENTOR
Jacob M. Sacks
BY John J. Pederson
ATTORNEY

United States Patent Office 2,954,423

Patented Sept. 27, 1960

2,954,423

SUBSCRIPTION TELEVISION

Jacob M. Sacks, Corona, Calif., assignor to Zenith Radio Corporation, a corporation of Delaware Continuation of application Ser. No. 259,169, Nov. 30, 1951. This application Dec. 5, 1957, Ser. No. 700,855

10 Claims. (Cl. 178—5.1)

This invention relates to subscription television systems in which a television signal is distributed in coded form for use only in subscriber receivers having appropriate decoding equipment actuated in accordance with the code schedule of the telecast. This application is a continuation of copending application Serial No. 259,169, filed November 30, 1951, and assigned to the present assignee.

Since the invention may be practiced in either a subscription television transmitter or a receiver, the term "encoding" is used herein in its generic sense to encompass either coding at the transmitter or decoding at the receiver.

In certain prior subscription television systems, such as that disclosed in copending application Serial No. 230,618, filed June 8, 1951, and issued December 10, 1957 as Patent 2,816,156, in the name of Myron G. Pawley et al., and assigned to the present assignee, an encoding signal sourc develops an encoding signal having a characteristic which varies after predetermined discrete time intervals. This may take the form of a rectangularly shaped signal having amplitude changes occurring with either periodic or random time spacing. The encoding signal is then utilized to effect mode changes as determined by the timing of the characteristic variations. For example, a different mode of operation may be established by changing the time relationship between the video and synchronizing components of the television signal.

While the mode changing patterns produced by the previous systems, whether periodic or random, result in greatly distorted images at unauthorized receivers, it may be desirable additionally to increase the coding complexity by further scrambling the picture as reproduced by those unauthorized receivers. To this end, and in accordance with one aspect of the present invention, the characteristic variations of the encoding signal are timed to occur after predetermined discrete time intervals that are non-integrally related to a field-trace or frame interval. With this modification, the scrambled pattern, or at least a portion thereof, resulting on the image-reproducing device at an unauthorized receiver appears to "roll" or "walk" either up or down on the picture tube, depending on the exact relationship of the intervals between mode changes compared to the field-trace or frame intervals. This effect obtains by employing a multi-step cycling apparatus in the encoding signal generator which operates in cyclic fashion to produce mode changes in the television system after discrete time intervals non-integrally related to the time duration $t$ of a frame period. With this incommensurate relationship, the cycling apparatus is not in the identical condition or at the same operating step at the beginning of each successive frame period. In other words, if the cycling apparatus effects mode changes at least upon the completion of each sequence of operating steps, and the number of operating steps is not an even multiple or sub-multiple of the number of line intervals per frame, such a cycling apparatus necessarily assumes different operating conditions or steps at the beginning of successive frames so that mode changes do not occur at corresponding line traces of successive frames.

It is, accordingly, an object of the present invention to provide a new and improved subscription television system in which the television signal is coded with a high degree of complexity.

It is another object of the invention to provide an improved subscription television system which effects mode changes at such a rate that the scrambled image resulting at an unauthorized receiver gives the illusion of moving in a vertical direction.

A further object of the invention is to provide an improved subscription television system employing faster-than-field coding at such a rate that at least a portion of the scrambled image produced at an unauthoribed receiver appears to be moving in a vertical as well as a horizontal direction.

A subscription television system, constructed in accordance with one aspect of the invention to achieve the above objectives, translates a television signal comprising successive time intervals each of predetermined duration and each consisting of a plurality of line-trace intervals. The system includes an encoding device having a plurality of distinct operation conditions for varying the mode of translation of the television signal to effect encoding thereof in accordance with an applied actuating signal. An encoding signal source is also provided for producing an encoding signal having a characteristic which varies after predetermined discrete time intervals individually greater than a line-trace interval and non-integrally related to time interval $t$. Finally the system includes means for supplying the encoding signal to the encoding device for effecting actuation thereof between its operating conditions.

In accordance with another aspect of the present invention, the encoding device is actuated by a control mechanism which has a plurality of input circuits. A series of code signal components collectively representing at least a portion of a code schedule are initially subjected to a permuting operation and are then utilized to actuate the control mechanism over the input circuits. A permuting mechanism is employed that is adjustable to permit flexibility of operation while at the same time achieving a relatively high degree of security against unauthorized appropriation.

It is, therefore, another object of the invention to provide a subscription television system which exhibits a relatively high degree of secrecy by the employment of relatively simple and inexpensive circuitry.

This object is achieved in accordance with the invention by providing a control mechanism having a plurality of input circuits and having an output circuit coupled to the encoding device for effecting actuation thereof between its operating conditions. There is means for developing a series of code signal components collectively representing a code schedule. Additionally, there are means, including means coupled to the developing means and to the input circuits for permuting at least some of the code signal components, for controlling the operation of the control mechanism in accordance with the code schedule.

A further object of the invention is to provide a subscription television system which effects faster-than-field encoding between distinct operating modes in accordance with a code schedule which is conveyed to the subscriber receivers by an air rather than a wire link.

It is an ancillary object of the invention to provide a television system in which mode changes are effected after predetermined discrete time intervals individually having a duration different from the other discrete time intervals and less than the duration of each of the field-trace intervals.

In the present system a group of two-position switches are adjusted in order to determine the code produced. By changing the settings of the switches from program to program the code produced may be varied. In order therefore for the subscriber to be able to receive any desired program he is provided with a key code for setting the switches for the particular program so that his coder unit will produce the same sequence of pulses as that produced by the coder unit at the transmitting station. If desired the subscriber may be provided with this information so that he may himself set the switches or he may be provided with a code card which sets these switches. The code card feature of the system is disclosed and claimed in the copending application Serial No. 244,622, filed August 31, 1951 and issued July 3, 1956 as Patent 2,753,393, the same being embodied herein by reference, and the system and apparatus there shown may be employed to set the switches of the present coder unit.

The organization and manner of operation of the present invention, and further objects and advantages thereof, may be best understood by reference to the following specification and the accompanying drawings, it being understood that these serve to illustrate embodiments of the invention, and that variations thereof falling within the scope of the appended claims will be apparent to persons skilled in the art.

Figure 1:
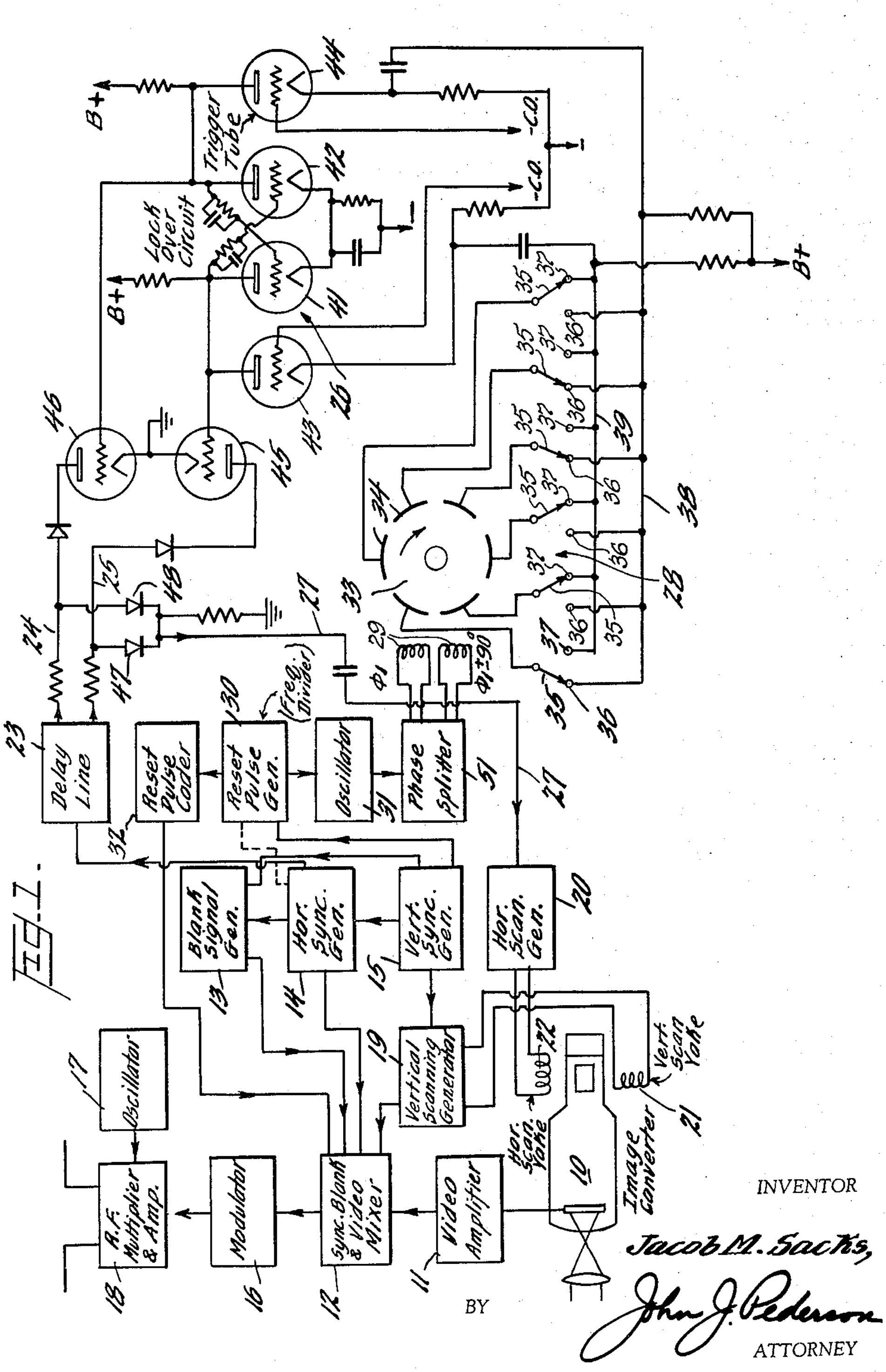
Figure 1 is a schematic diagram of a transmitter embodying the present invention.
Figures 2, 3:
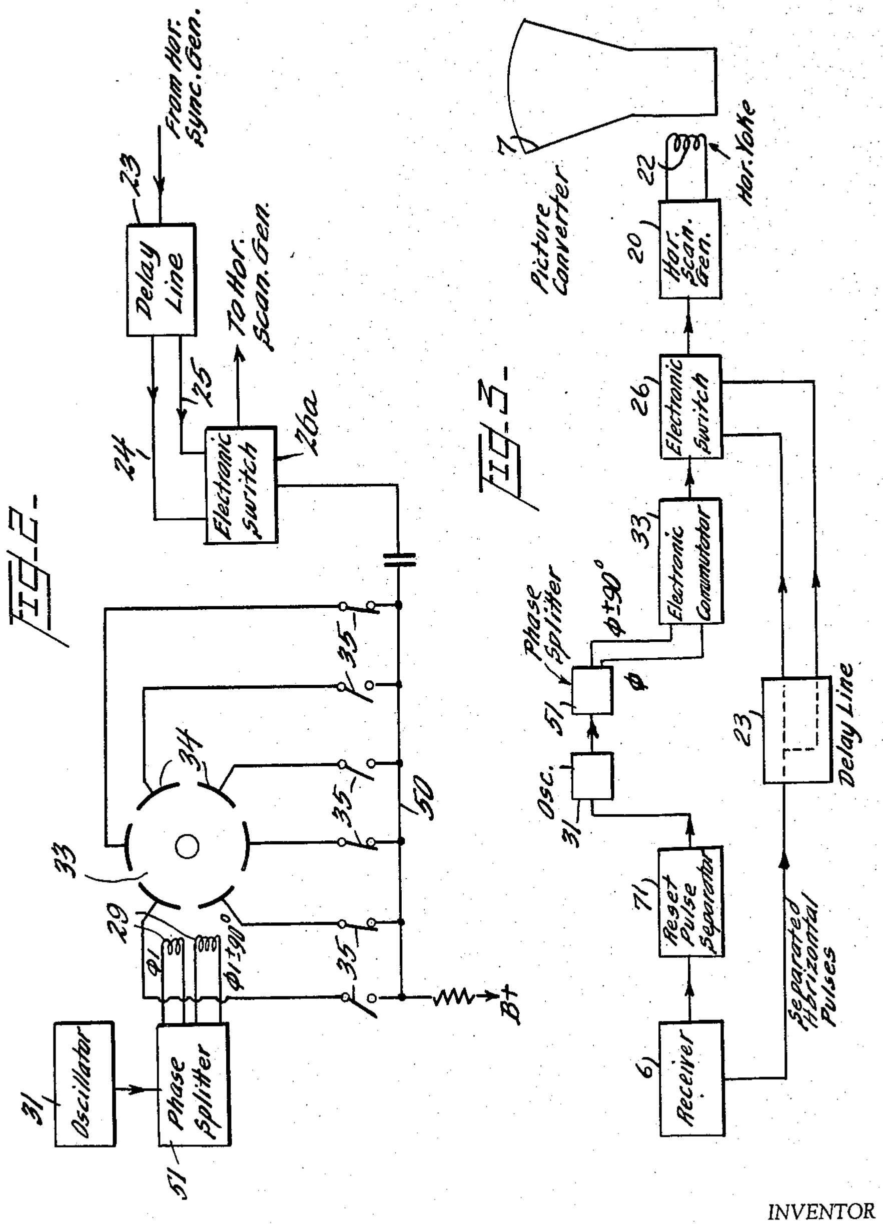
Figure 2 is a modified form of a portion of the transmitter of Figure 1 constructed in accordance with another embodiment.
Figure 3 represents a receiver embodying the present invention constructed to operate in conjunction with either the transmitter of Figure 1 or that of Figure 2.
Figures 4A, 4B, 5A, 5B:
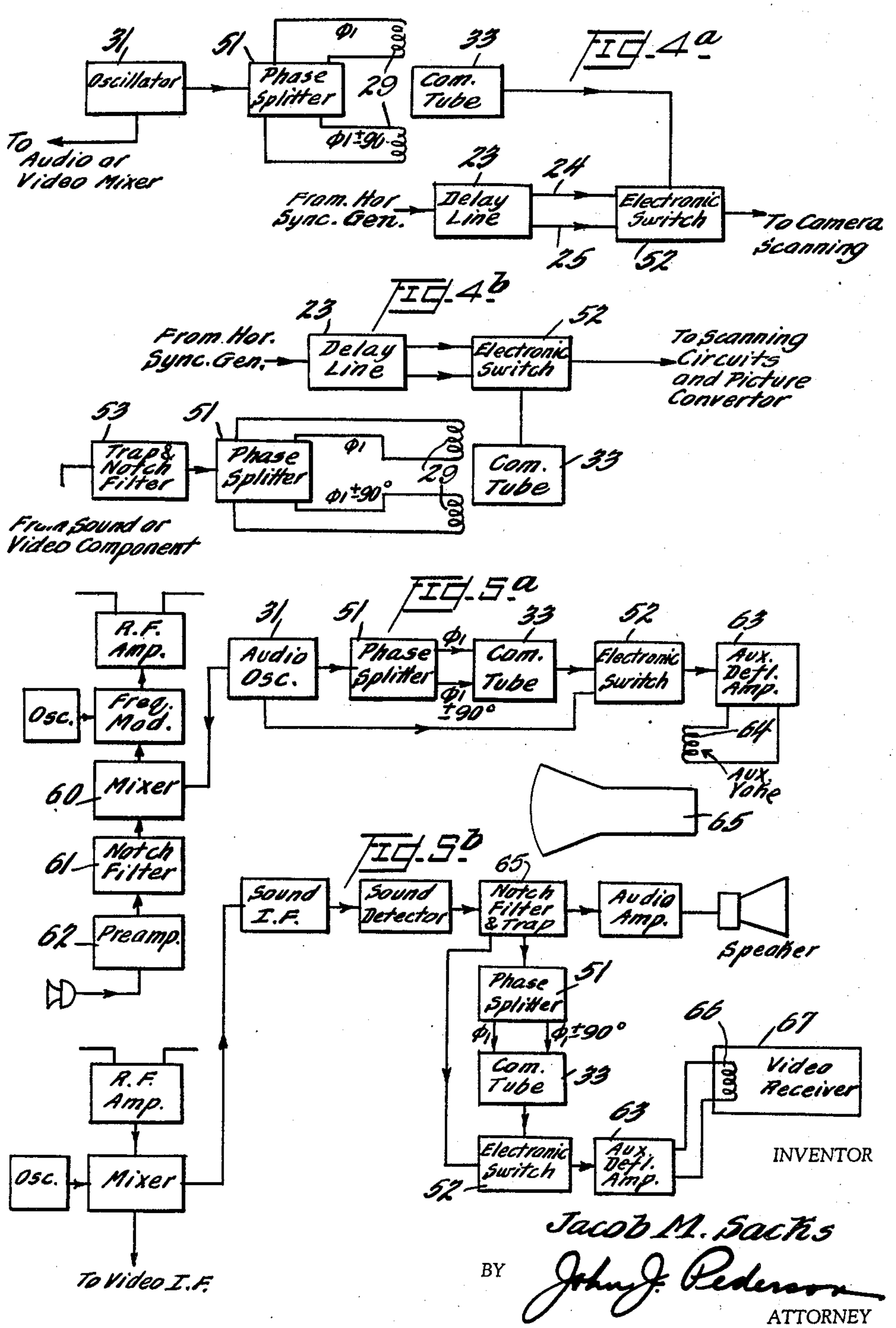

Figure 4*a* shows a modification of the transmitter of Figure 1 illustrating another embodiment of the invention;

Figure 4*b* shows a modification of the receiver of Figure 3 constructed in accordance with still another embodiment and adapted to decode the transmission of the transmitter of Figure 4*a*;

Figure 5*a* illustrates another transmitter embodying the invention; and,

Figure 5*b* is a schematic diagram of a receiver in accordance with a further embodiment of the invention and arranged to operate in conjunction with the transmitter of Figure 5*a*.

The coder unit of the present system employs for its operating element a vacuum tube commutator. Essentially this type of device comprises a cathode or electron emitter, a plurality of plates, and an electromagnetic coil or coils surrounding the envelope which serves to focus or direct some or all of the electrons upon the plates successively; this produces in rapid succession a switching or commutating of the electron beam from plate to plate, the process being repeated indefinitely as long as the tube is energized and the electromagnetic or electrostatic focusing or deflection device is continuously energized in a suitable manner. Any such electronic vacuum tube commutator may be employed in the present system, for example, the type of commutator shown in the patent to Skellett 2,217,774 (of October 15, 1940) and to Hecht et al. 2,391,967 (of January 1, 1946) may be employed in the present system. In these commutators the anodes are mounted in a cylindrical boundary encompassing the cathode, a direct current source is connected between the cathode and the anodes, and coils are mounted around the tube and connected to a source of 2-phase alternating current thereby producing a continuously and uniformly rotating magnetic field which operates to focus or direct the electrons emanating from the cathode upon each of the anodes in succession. It is preferred, as shown by Hecht, that a cylindrical shield member be interposed between the cathode and the anode, this shield member having a series of openings, opposite each anode plate, which produce sharply defined narrow pulses.

In Figure 1 the transmitting system illustrated provides that the horizontal scanning in the camera should recurrently step out of time or out of phase with the horizontal synchronizing signal as broadcast. This recurrent time or phase shift is varied in accordance with the code schedule of an encoding signal generated by the coder unit or encoding signal source. It will be understood, however, that this represents only one type of jitter or distortion and that other types of jitter or distortion may be effected by means of the present invention, such as a coded reversal in polarity of the video signal, or reversal in the direction of scanning.

In the system shown in Figure 1, picture signal generating tube 10 may be of any desirable type which delivers a video signal to video amplifier 11. The amplified video signal is then transmitted to mixer 12 which receives the customary blanking, horizontal synchronizing, and vertical synchronizing signals from their corresponding generators 13, 14 and 15. The composite video signal is then passed to modulator 16 which modulates a carrier wave, developed in oscillator 17, in R.F. amplifier 18. The modulated carrier is then translated to the antenna.

The scanning of the image in the camera tube 10 is controlled by vertical scanning generator 19 and horizontal scanning generator 20 which provide scanning power to their respective yokes 21 and 22.

The parts thus far described are the usual elements of a conventional television transmitter and need not be described with any further detail. In the conventional television transmitter the horizontal synchronizing generator is connected directly to the horizontal sweep or scanning generator for the camera.

In the present system, however, delay line 23 is interposed between horizontal synchronizing signal generator 14 and horizontal sweep generator 20 at the transmitter. In the absence of the delay line the horizontal scanning operation would be in step or phase with the horizontal synchronizing signal. The interposition of the delay line between the synchronizing signal generator and the horizontal sweep generator provides for a time or phase shift between the horizontal scanning at the camera and the horizontal synchronizing signal as broadcast.

The present invention further provides that this shift should be variable in accordance with a code. For this purpose the delay line is provided with two outgoing leads 24 and 25. One of these leads, for example 24, may by-pass the delay line, whereas the other lead 25 is connected to the output of the delay line. Delay line 23 is either functionally included in the circuit between generator 14 and generator 20 or it is not, depending on the instantaneous conductive conditions of tubes 45 and 46. Thus, delay line 23, tubes 45 and 46, and their associated circuitry, collectively constitute an encoding or coding device having a plurality of distinct operating conditions each of which establishes a different operating mode in the transmitter; specifically, each operating condition introduces a different time relationship between the video components and the radiated horizontal- or line-synchronizing components.

Electronic switch or control mechanism 26, which consists of tubes 41–44 and their associated circuitry, operates to actuate the encoding device between its operating conditions to connect either lead 24 or lead 25 to the horizontal sweep generator of the camera through conductor 27.

Merely for the purpose of simplifying the present diagram, the delay line is shown with the two outgoing leads described above. It will be understood, however, that, if desired, the delay line may include several delay sections with a corresponding number of outgoing lead lines and a multiposition electronic switch may then operate to vary the amount of delay as desired in accordance with the coding schedule.

The operation of the control mechanism or electronic switch is controlled by coder or cycling apparatus 28 which will be discussed more in detail in a later portion of this specification. At this point, however, it should be understood that the coder unit 28 controls the operation of the switch 26 in accordance with a code schedule which may be varied as desired by the proper setting of a plurality of toggle switches.

Broadly, the cycling apparatus generates a repeated binary code which is represented by pulses derived by the proper setting of a plurality of two-position switches. These pulses are delivered to the electronic switch which thereby actuates the encoding device to vary the connection of the delay line 23 to the horizontal scanning generator.

While the coder unit or cycling apparatus may be operated by any desired source of regularly spaced pulses, it is advantageous to operate it by the vertical synchronizing pulses which customarily recur at a rate of 60 per second, under United States standards.

The cycling apparatus employed in the present system receives the regularly spaced vertical synchronizing pulses, which recur conventionally at a rate of 60 per second, and as a result of its operation its delivers at its output a repeated cycle of pulses representing binary digits, these pulses being in phase with the vertical synchronizing pulses. In order to maintain the operation of the cycling apparatus and to eliminate all necessity for its adjustment during its operation, it is desirable to provide the coding system with a pulse which coincides with the first of each group of the code. Thus, if the code provides for a group of eight pulses, it is desirable to provide the coding system with a single pulse for every eighth vertical synchronizing pulse, the same, of course, to be in phase with the synchronizing pulses. This cycling pulse will be referred to as the reset or code system synchronizing pulse.

The reset pulse, it will be understood, serves at the transmitting station, and, as will appear later, also at the subscribers' receiving stations to synchronize the several components in each code system. For this purpose vertical synchronizing generator 15, which, as has been described, delivers its output to vertical scanning generator 19 for conventional vertical scanning, also delivers its output to reset pulse generator 30. Reset pulse generator 30 may be any suitable conventional frequency divider and operates to receive the vertical synchronizing pulses at the rate of 60 per second and delivers pulses at a reduced frequency as, for example, one for every eight vertical synchronizing pulses. The frequency of the pulses delivered by the reset pulse generator is determined by the number of pulses in each code group. When, for example, the code group has eight pulses, reset pulse generator 30 will be designed to deliver one reset pulse for every eight vertical synchronizing pulses.

The reset pulses are delivered by generator 30 to oscillator 31 which is coupled to a 2-phase generator 51 which in turn delivers 2-phase current to windings 29 of commutator tube 33. Oscillator 31 includes an automatic frequency and phase control circuit which is under the control of the reset pulses. The frequency of the oscillator is thus controlled by the frequency of the reset pulses and generates one complete cycle between each pair of successive reset pulses. Thus, between each pair of pulses, commutator tube 33 completes a cycle of operation in that the focused or directed beam of electrons is made to sweep or deflect across the entire set of anode plates 34, one at a time, and then proceeds continuously in step with the reset pulses. Each of anodes 34 is connected to a two-position switch 35. Each switch has a pair of fixed contacts 36, 37 connected to conductors 38 and 39, respectively, which in turn are separately connected to a source of positive unidirectional potential. All of switches 35 may collectively be considered a permutation or switching mechanism for permuting the conductors from anodes 34 to conductors 38 and 39. Each adjustable switch 35 has a plurality of operating positions for collectively establishing different prescribed ones of a multiplicity of different intercoupling patterns between the output circuits of anodes 34 and conductors 38 and 39 in accordance with the instantaneous position of the switches with respect to one another.

In operation, the cycling apparatus as thus far described supplies pulses to the conductors 38 or 39 depending upon the position of the permutation mechanism which comprises switches 35. The actuating signal delivered by the cycling apparatus consists of a repeated series of pulses, the number of pulses in each series being determined by the number of plates in the commutator or by the number of switches 35. The code or make up of the actuating signal is varied by varying the positioning of these switches to vary the intercoupling pattern between anodes 34 and leads 38 and 39 so that some of the pulses may be delivered to the conductor 38 and other pulses to conductor 39.

The electronic switch or control mechanism 26 comprises the lockover circuit which includes triodes 41 and 42 and trigger tubes 43 and 44. The plate circuits of tubes 45 and 46 are connected to the output lines 24 and 25 of delay line 23, the output lines 24 and 25 being also connected to the horizontal scanning generator 20 through the unidirectional diodes 48 and 47 respectively.

When a pulse is delivered by the commutator through a switch 35 to line 38, trigger tube 44 is rendered conductive, thus rendering tube 42 of the lockover circuit conductive and tube 41 non-conductive. As a consequence, tube 46 is cut off, thereby removing the ground by-pass from output lead 24 of the delay line 23 and the horizontal synchronizing pulses then pass through output conductor 24 and diode 48 to horizontal synchronizing generator 20. The synchronizing pulses therefore enter the horizontal synchronizing generator undelayed. However, when a pulse is delivered by the cycling apparatus to line 39, trigger tube 43 is energized and the lockover circuit operates in the opposite direction; that is, tube 41 is rendered conductive and tube 42 is turned off, with the consequence that tube 45 is turned off and the horizontal synchronizing pulses pass through the delay line and out over conductor 25 to horizontal synchronizing generator 20 by way of diode 47. Thus, depending upon the positions of the several switches 35, the horizontal synchronizing pulses are delayed or undelayed in accordance with a predetermined code schedule.

Conductors 38 and 39 may be considered input circuits for the multi-stable control mechanism (comprising tubes 41–44 and the associated circuitry), each of these input circuits being differently responsive to an actuating signal to operate the control mechanism to an assigned one of its operating conditions. Each time the control mechanism assumes a different operating condition, the encoding device (comprising delay line 23, tubes 45 and 46 and conductors 24 and 25) does likewise to establish the transmitter in a different operating mode.

Commutator 33, is driving circuitry, and switches 35 constitute means for developing a series of code signal components (namely, the pulses developed in the output circuits connected to anodes 34) and means coupled to input circuits 38, 39 for utilizing certain selected ones of the code signal components to actuate one of the input circuits and for utilizing certain other selected ones of the code signal components to actuate another one of the input circuits to effect operation of the control mechanism between its operating conditions to vary the operating condition of the encoding device.

Viewed differently, the cycling apparatus delivers to conductor 38 a repeated sequence of On or Off pulses and it also delivers to conductor 39 a repeated complemental sequence of On or Off pulses. The binary coder as thus far described can also be viewed as delivering a repeated predetermined sequence of pulses to the conductors 38 or 39. If desired a coder may be employed which includes the commutator tube as described and a set of switches as described but which, however, contains only one output line or conductor so that switches 35 comprising the switching mechanism are either connected to the output line and are therefore On, or else are disconnected from the output line and are therefore Off. This coder therefore also delivers a predetermined sequence of On or Off pulses to one output line and this single sequence of pulses is utilized in the operation of an electronic switch or control mechanism for controlling the passage of the horizontal synchronizing pulses through the delay line. This type of coder is shown in Figure 2 and will be seen to contain a 2-phase generator 51 providing deflection signals to windings 29 which are 90° out of phase with each other, and which serve to focus or direct the beam of electrons in the electronic commutator 33 around the series of plates or anodes 34 connected to switches 35, the fixed contacts of the switches being connected to output line 50.

Thus, line or conductor 50 receives a repeated predetermined sequence of On or Off pulses which are delivered to electronic switch or control mechanism 26*a* shown in Figures 4 or 5 of the first above-mentioned pending application which need not be reproduced here. It should be clearly understood from preceding parts of the present specification that the electronic switch controls the flow of the horizontal synchronizing pulses through the delay line 23, so that the pulses either pass by way of output lead 24 through electronic switch 26*a* to the horizontal scanning generator undelayed, or the horizontal synchronizing pulses pass through the delay line 23 by way of the output conductor 25 and through the electronic switch 26*a* to the horizontal scanning generator.

Figure 3 is a block diagram of a receiver designed to utilize the coded video signal and reset pulses radiated by the transmitter of Figure 1 and to convert the video signal, which in a conventional receiver will produce an abnormal and unintelligible image, into a normal visual image on an image converter or reproducer. For this purpose the encoding equipment described above is employed in the receiver in the same manner as it is employed in the transmitter, namely to translate the horizontal synchronizing pulses through one part or through the other part of a corresponding delay line 23 in phase or in synchronism with the corresponding operation in the transmitter. The encoding equipment in the receiver operates in the same manner as the encoding equipment in the transmitter and, because the receiver equipment converts an otherwise unintelligible video signal into a normal image, it may be spoken of as a decoding apparatus.

The receiver may be a conventional receiver of any desired construction and design, and is shown by block 6, horizontal scanning generator 20, horizontal scanning yoke 22, and picture reproducer or converter 7. Reset pulse separator 71 separates the reset pulses from the composite signal received by the receiver and serves to phase the decoding equipment to maintain it in step or in synchronism with the coding apparatus at the transmitter. The remaining blocks in Figure 3 correspond to elements shown in Figure 1 and described hereinabove and include oscillator 31, two-phase generator or phase splitter 51, and electronic commutator 33. Unit 33 sends the desired sequence of pulses, the same as the sequence employed at the transmitter for the program being received, to electronic switch 26. The separated horizontal synchronizing pulses pass through one or the other circuit in delay line 23, this operation being controlled by electronic switch 26, and through the switch to scanning generator 20 and horizontal scanning yoke 22. Some of the components in Figure 3 are the same as the corresponding components in Figure 1 and thus bear the same reference characters. They operate and function in the same manner as in Figure 1.

It will be understood that in lieu of the cycling apparatus which is provided with two output lines, the arrangement shown in Figure 2 may be employed in the receiver in combination with the electronic switch.

The reset pulses in the present system may be derived by means of a frequency divider from the vertical synchronizing pulses so that they are in phase with the selected vertical synchronizing pulses depending upon the number of anodes in the commutator tube. As for example, when the number of anodes in the commutator tube is 8, one reset pulse would be provided for each eighth vertical synchronizing pulse.

If desired, however, each vertical synchronizing pulse may itself be employed as a reset pulse. In a system of this type the vertical synchronizing generator would be connected directly to oscillator 31 and thereby cause it to generate a sine wave of 60 cycles per second, the present conventional frequency of the vertical synchronizing pulses. Since there is a mode change each time the electron beam in commutator 33 shifts to another anode 34 whose associated switch 35 is in a different condition, and since commutator 33 completes a cycle of operating steps (the number of steps being equal to the number of anodes 34) during every field-trace interval when oscillator 31 operates at 60 cycles per second, the mode changes in the system actually occur at a rate that is faster than the field-scanning frequency.

If it is desired to obtain a type of distortion that overlaps from field to field or from frame to frame, the horizontal synchronizing pulses may be employed for generating a reset pulse. In a system of this type, the horizontal synchronizing pulses are delivered to reset pulse generator or frequency divider 30 as indicated by dotted lines in Figure 1. When this type of system is employed, the occurrence of the reset pulses may be related to the frequency of the horizontal synchronizing pulses in such a manner that the distortion obtained will overlap from frame to frame or field to field. For this purpose the frequency of the reset pulses should be such that it is not divisible by or into sixty, the frequency of the vertical synchronizing pulses, or thirty, the frame recurrence frequency. In other words, the frequency of the reset pulses and either the field or frame recurrence frequency are non-integrally related; namely, when one frequency is divided into the other, a fraction rather than an integer results. With such a reset pulse the distortion pattern will vary from frame to frame or from field to field.

When this incommensurate type operation is employed, the picture gives the appearance or illusion of "walking," "rolling" or "moving" toward the bottom or top of the picture tube at an unauthorized receiver, thus adding to the scrambling or "muss up" of the coded telecast. This modification consequently provides a still higher degree of unintelligibility since at least one more scrambling technique is effectively included in the previously described system.

Commutator 33 and its driving circuitry, switches 35, and tubes 41–44 and their associated circuitry may collectively be considered an encoding signal source for producing an encoding signal having a characteristic (amplitude) which varies after predetermined discrete time intervals individually greater than a line- or horizontal-trace interval and non-integrally related to the time interval of a frame period. This encoding signal is applied to the encoding device for effecting actuation thereof between its operating conditions.

The video signal generated at the image converter 10 is transmitted over the air in a plurality of states or modes (being switched from one to another in accordance with a code schedule) which when received by a conventional television receiver will produce a considerably distorted image. In order to receive an undistorted image, the subscribers' receivers are provided with cycling apparatus, an electronic switch and a delay line as described immediately above, with a consequence that the operation of the system is in phase with the operation of the transmitter and the image generated on the picture reproducer at each receiver is rendered intelligible. In order to maintain the decoding apparatus of the receivers in phase and in synchronism with the coding apparatus at the transmitter, the reset pulses generated in generator 30 are double coded by reset pulse coder 32 and are then introduced into mixer 12 and transmitted with the video signal. It will be understood that if desired the reset pulses may be transmitted in the audio envelope as shown and described in the pending application Serial No. 244,336, filed August 30, 1951. The transmitted reset pulses may be considered a code signal which represents the code schedule of the telecast.

In the system thus far described, each receiver contains a 2-phase generator 51 which supplies the 2-phase current to the coils of the electronic commutator; oscillator 31 is maintained in phase with the corresponding oscillator at the transmitter by means of the code signal or reset pulses. Figures 4*a* and 4*b* disclose a modified system in which the 2-phase oscillations generated at the transmitting station are radiated either in the video carrier or in the audio carrier as desired, and this wave is received by each receiver, separated from the video or audio components by means of a trap or notch filter and applied directly to the coils of the electronic commutator. In a system of this type no reset pulses are necessary since the radiated 2-phase sinusoidal wave maintains synchronism between the commutator at the receiver and the transmitter.

Figure 4*a* illustrates such a transmitter. Oscillator 31 delivers its output to the audio or video mixer as desired so that it is radiated with the video or audio components and its output is also directed to phase splitter 51 which delivers the 2-phase current to windings 29 of commutator tube 33. The cycling apparatus delivers its output to electronic switch 52 which serves to convey the horizontal synchronizing pulses through delay line 23 and its output terminal conductors 24, 25 to the camera scanning apparatus. Commutator tube 33 is provided with a two-position switch in each anode circuit as shown in Figures 1 and 2, the switches having one conductor 50 as shown in Figure 2 or two conductors 38, 39 as shown in Figure 1. The electronic switch, which under the control of the pulses received from the switches operates to pass the horizontal synchronizing pulses through the delay line or to by-pass the delay line depending upon the code, may be either of the type shown in Figure 1 which includes the lockover circuit or it may be of the type shown in Figures 4 or 5 of copending application, Serial No. 230,618.

Figure 4*b* shows a receiver which is designed to receive the video signal radiated by the transmitter of Figure 4*a*. Trap or notch filter 53 separates the sinusoidal code signal generated by oscillator 31 at the transmitter from either the audio or video component and delivers the same to windings 29 through phase splitter 51. Commutator tube 33 and electronic switch 52 operate in the same manner as at the transmitter to provide the proper periodic shifting of the horizontal synchronizing pulses in synchronism with the shifting that takes place at the transmitter so the scanning operation of the picture converter at the receiver is in phase with the scanning operation at the transmitter.

The electronic commutator is shown herein as operated by a rotating electromagnetic field. It will be understood that the same may be accomplished by a rotating electrostatic field.

Figures 5*a* and 5*b* show a system in which the present encoding apparatus is employed in the systems shown and described in copending application Serial No. 257,698, filed November 23, 1951, now abandoned which is embodied herein by reference. In that application an auxiliary deflection coil is mounted on the neck of the picture converter at the transmitter and the picture reproducer at the receiver. The auxiliary coil is supplied with energy which works upon the electron beams at the same time the normal scanning or deflection coils operate, thereby creating abnormal states in the video signal which causes a distorted picture when the signal is received by a conventional receiver, but which with the aid of an auxiliary deflection coil and the encoding apparatus at the transmitter and receiver cause the subscribers' receivers to produce an undistorted image. In the present modification of this type of system, the output of the oscillator provides not only the energy for the coils of the electronic commutator but also supplies the energy to the auxiliary deflection coil in accordance with the code generated by the coding apparatus. At the receiver, the waveform of the code oscillator is received, separated and then employed in the same manner as at the transmitter; i.e. the waveform operates the electronic commutator which controls an electronic switch to apply portions of each wave to the auxiliary deflection coil in phase with the operation of the auxiliary deflection coil at the transmitter.

In Figure 5*a* the output of oscillator 31 is delivered to audio mixer 60. In order that the signal from oscillator 31 retain its original sinusoidal form when it is received, notch filter 61 precedes the audio mixer. This filter removes from the sound delivered by amplifier 62 a narrow band of frequencies which include the frequency of oscillator 31. The output of oscillator 31 passes through phase splitter 51 and is delivered to the coils of commutator tube 33. Electronic switch 52 operates in accordance with the code of pulses delivered by the tube 33 and thus delivers portions of the output of the oscillator 31 through amplifier 63 to auxiliary deflection yoke 64 of picture converter 65. The video signal generated is therefore distorted and is radiated in this distorted form.

At the receiver, as shown in Figure 5*b*, notch filter and trap 65 removes the waveform of oscillator 31 from the audio portion of the composite signal received. This waveform then passes through phase splitter 51 and is delivered to commutator tube 33. Electronic switch 52 operates under control of the code pulses delivered by the commutator 33 to deliver segments of the waveform delivered by the filter and trap 65 through amplifier 63 to auxiliary deflection coil 66 on the picture tube of video receiver 67.

In the system as shown in Figures 5*a* and 5*b* the sinusoidal waveform generated by oscillator 31 controls the operation of the coding apparatus at the transmitter and the decoding apparatus at each receiver and maintains them all in phase or in step with each other. The same sinusoidal waveform also supplies the energy to the auxiliary deflection yoke. The encoding apparatus together with the electronic switch operate to segmentalize each cycle of the waveform delivered by oscillator 31 and to deliver selected portions or segments of this waveform to the auxiliary deflection yokes in all the receivers as well as at the transmitter. Each encoding apparatus, as has previously been explained, has a series of two-position switches 35 which determine the segments which are applied to the auxiliary yoke. Thus in this system, as in the other systems described herein, by means of these devices the scanning at the receiver is made to be in phase with the scanning at the transmitter and an undistorted image is thus obtained.

In all the systems described herein the pulse sequence is determined by the setting of the two-position switches 35. If desired, the arrangement and order of the switches may be varied for each set in a limited geographic area with the consequence that each set has its own unique key code.

While particular embodiments of the invention have been shown and described, modifications may be made, and it is intended in the appended claims to cover all such modifications as fall within the true spirit and scope of the invention.

I claim:

1. A subscription television system comprising: an encoding device having a plurality of distinct operating conditions each of which establishes a different operating mode in said system; a multi-stable control mechanism having a plurality of input circuits, each of which responds to an applied signal to actuate said control mechanism to an assigned one of a plurality of stable operating conditions in which assigned condition said control mechanism remains subsequent to the termination of the applied signal until the application of a succeeding signal, and having an output circuit coupled to said encoding device for effecting actuation thereof between its operating conditions; means for developing a series of code signal components collectively representing at least a portion of a code schedule; and means, including means coupled to said developing means and to said input circuits for permuting at least some of said code signal components, for applying time spaced signals to said input circuits to control the operation of said control mechanism in accordance with said code schedule.

2. A subscription television system comprising: an encoding device having a plurality of distinct operating conditions each of which establishes a different operating mode in said system; a multi-stable control mechanism coupled to said encoding device having a plurality of stable operating conditions, at least some of which are effective to establish said encoding device in assigned ones of its aforesaid operating conditions; a plurality of input circuits for said control mechanism, individually differently actuatable in response to an applied signal to operate said control mechanism to an assigned one of its aforesaid operating conditions in which assigned condition said control mechanism remains subsequent to the termination of the applied signal until the application of a succeeding signal; means for developing a series of code signal components collectively representing at least a portion of a code schedule; and means, coupled to said developing means and to said input circuits including an adjustable switching mechanism for utilizing certain ones of said code signal components to apply time spaced signals to one of said input circuits to effect actuation thereof, as determined by the instantaneous adjustment of said switching mechanism, and for utilizing certain other ones of said code signal components to apply time spaced signals to another one of said input circuits to effect actuation thereof, also as determined by the instantaneous adjustment of said switching mechanism, to effect operation of said control mechanism between its aforesaid operating conditions to vary the operating condition of said encoding device.

3. A subscription television system comprising: an encoding device having a plurality of distinct operating conditions each of which establishes a different operating mode in said system; a multi-stable control mechanism coupled to said encoding device having a plurality of stable operating conditions, at least some of which are effective to establish said encoding device in assigned ones of its aforesaid operating conditions; a plurality of input circuits for said control mechanism, individually differently actuatable in response to an applied signal to operate said control mechanism to an assigned one of its aforesaid operating conditions in which assigned condition said control mechanism remains subsequent to the termination of the applied signal until the application of a succeeding signal; means having a plurality of output circuits for developing a series of code signal components collectively representing at least a portion of a code schedule; and means coupled to said output circuits and said input circuits, including a plurality of adjustable switches individually having a plurality of operating positions for collectively establishing different prescribed ones of a multiplicity of different intercoupling patterns between said output circuits and said input circuits in accordance with the instantaneous positions of each of said switches with respect to one another, for utilizing certain ones of said code signal components to apply time spaced signals to one of said input circuits to effect actuation thereof as determined by the instantaneous intercoupling pattern established by said switches and for utilizing certain other ones of said code signal components to apply time spaced signals to another one of said input circuits to effect actuation thereof also as determined by the instantaneous intercoupling pattern established by said switches, to effect operation of said control mechanism between its aforesaid operating conditions to vary the operating condition of said encoding device.

4. A subscription television system comprising: an encoding device having a plurality of distinct operating conditions each of which establishes a different operating mode in said system; a bi-stable control mechanism coupled to said encoding device for effecting actuation thereof and having two stable operating conditions in each of which said encoding device establishes a different operating mode in said system; a plurality of input circuits for said control mechanism, individually differently actuatable in response to an applied signal to operate said control mechanism to an assigned one of its aforesaid operating conditions in which assigned condition said control mechanism remains subsequent to the termination of the applied signal until the application of a succeeding signal; means for developing a series of code signal components collectively representing at least a portion of a code schedule; and means, coupled to said developing means and to said input circuits, including an adjustable switching mechanism for utilizing certain ones of said code signal components to apply time spaced signals to one of said input circuits to effect actuation thereof, as determined by the instantaneous adjustment of said switching mechanism, and for utilizing certain other ones of said code signal components to apply time spaced signals to another one of said input circuits to effect actuation thereof, also as determined by the instantaneous adjustment of said switching mechanism, to effect operation of said control mechanism between its aforesaid operating conditions to vary the operating condition of said encoding device.

5. A subscription television transmitter comprising: a coding device having a plurality of distinct operating conditions each of which establishes a different operating mode in said transmitter; a multi-stable control mechanism coupled to said coding device having a plurality of stable operating conditions, at least some of which are effective to establish said coding device in assigned ones of its aforesaid operating conditions; a plurality of input circuits for said control mechanism, individually differently actuatable in response to an applied signal to operate said control mechanism to an assigned one of its aforesaid operating conditions in which assigned condition said control mechanism remains subsequent to the termination of the applied signal until the application of a succeeding signal; means for developing a series of code signal components collectively representing at least a portion of a code schedule; and means, coupled to said developing means and to said input circuits, including an adjustable switching mechanism for utilizing certain ones of said code signal components to apply time spaced signals to one of said input circuits to effect actuation thereof, as determined by the instantaneous adjustment of said switching mechanism, and for utilizing certain other ones of said code signal components to apply time spaced signals to another one of said input circuits to effect actuation thereof, also as determined by the instantaneous adjustment of said switching mechanism, to effect operation of said control mechanism between its aforesaid operating conditions to vary the operating conditions of said coding device.

6. A subscription television transmitter comprising: a coding device having a plurality of distinct operating conditions each of which establishes a different operating mode in said transmitter; a multi-stable control mechanism coupled to said coding device having a plurality of stable operating conditions, at least some of which are effective to establish said coding device in assigned ones of its aforesaid operating conditions; a plurality of input circuits for said control mechanism, individually differently actuatable in response to an applied signal to operate said control mechanism to an assigned one of its aforesaid operating conditions in which assigned condition said control mechanism remains subsequent to the termination of the applied signal until the application of a succeeding signal; means for developing a series of code signal components collectively representing at least a portion of a code schedule; means, coupled to said developing means and to said input circuits, including an adjustable switching mechanism for utilizing certain ones of said code signal components to apply time spaced signals to one of said input circuits to effect actuation thereof, as determined by the instantaneous adjustment of said switching mechanism, and for utilizing certain other ones of said code signal components to apply time spaced signals to another one of said input circuits to effect actuation thereof, also as determined by the instantaneous adjustment of said switching mechanism, to effect operation of said control mechanism between its aforesaid operating conditions to vary the operating condition of said encoding device; and means coupled to said developing means for transmitting to a subscriber receiver a signal representing at least a portion of said code schedule.

7. A subscription television receiver comprising: a decoding device having a plurality of distinct operating conditions each of which establishes a different operating mode in said receiver; a multi-stable control mechanism coupled to said decoding device having a plurality of stable operating conditions, at least some of which are effective to establish said decoding device in assigned ones of its aforesaid operating conditions; a plurality of input circuits for said control mechanism, individually differently actuatable in response to an applied signal to operate said control mechanism to an assigned one of its aforesaid operating conditions in which assigned condition said control mechanism remains subsequent to the termination of the applied signal until the application of a succeeding signal; means for developing a series of code signal components collectively representing at least a portion of a code schedule; and means, coupled to said developing means and to said input circuits, including an adjustable switching mechanism for utilizing certain ones of said code signal components to apply time spaced signals to one of said input circuits to effect actuation thereof, as determined by the instantaneous adjustment of said switching mechanism, and for utilizing certain other ones of said code signal components to apply time spaced signals to another one of said input circuits to effect actuation thereof, also as determined by the instantaneous adjustment of said switching mechanism, to effect operation of said control mechanism between its aforesaid operating conditions to vary the operating conditions of said decoding device.

8. A subscription television transmitter for transmitting a television signal having video components included within a recurring series of field-trace intervals and including the customary line- and field-synchronizing components, said transmitter comprising: a coding device having a plurality of distinct operating conditions each of which establishes a different operating mode in said transmitter; cycling apparatus having a plurality of operating steps in each cycle for producing a coding signal having a characteristic which varies upon the completion of each cycle of operating steps; means coupling said cycling apparatus to said coding device to actuate said device between its aforesaid operating conditions in response to said coding signal; actuating means for effecting actuation of said cycling apparatus at a rate that is faster than the recurrence rate of said field-trace intervals to effect faster-than-field rate operation of said coding device to achieve coding of said television signal in accordance with a predetermined code schedule; means coupled to said actuating means for developing a code signal, separately identifiable from said line- and field-synchronizing components, representing said code schedule; and means coupled to said code signal developing means for transmitting to a subscriber receiver the coded television signal including said line- and field-synchronizing components and also said code signal.

9. A subscription television receiver for utilizing a received coded signal having video components included within a recurring series of field-trace intervals and including the customary line- and field-synchronizing components and for also utilizing a received code signal, separately identifiable from said line- and field-synchronizing components, representing the code schedule of said coded television signal, said receiver comprising: an image-reproducing device and an associated scanning system; means for supplying said video components to said image-reproducing device and said line- and field-synchronizing components to said scanning system; a decoding device included in said last-mentioned means and having a plurality of distinct operating conditions each of which establishes a different operating mode in said system; cycling apparatus having a plurality of operating steps in each cycle for producing a decoding signal having a characteristic which varies at least upon the completion of each cycle of operating steps; means coupling said cycling apparatus to said decoding device to actuate said device between its aforesaid operating conditions in response to said decoding signal; means for deriving said code signal; and means coupled to said code signal deriving means for effecting actuation of said cycling apparatus at a rate that is faster than the recurrence rate of said field-trace intervals to effect faster-than-field rate operation of said decoding device to achieve decoding of said television signal.

10. A subscription television system for transmitting a television signal having video components included within a recurring series of field-trace intervals comprising: an encoding device having a plurality of distinct operating conditions each of which establishes a different operating mode in said system; an encoding signal source for producing an encoding signal having a characteristic which varies after predetermined discrete time intervals individually having a duration different from those of the remaining such discrete time intervals and less than the duration of each of said field-trace intervals; and means coupled to said encoding signal source and to said encoding device for utilizing the variations of said characteristic of said encoding signal to effect actuation of said encoding device.

References Cited in the file of this patent

UNITED STATES PATENTS

| | | |
|---|---|---|
| 2,401,405 | Bedford | June 4, 1946 |
| 2,414,101 | Hogan | Jan. 14, 1947 |
| 2,472,774 | Mayle | June 7, 1949 |
| 2,487,682 | Wendt | Nov. 8, 1949 |
| 2,656,406 | Gray | Oct. 20, 1953 |